United States Patent [19]

Wachs et al.

[11] 4,260,255
[45] Apr. 7, 1981

[54] HIGH ENERGY LASER BEAM SAMPLING METER

[75] Inventors: John J. Wachs; Andrew H. Jenkins, both of Huntsville, Ala.

[73] Assignee: The United States of America as represented by the Secretary of the Army, Washington, D.C.

[21] Appl. No.: 87,117

[22] Filed: Oct. 22, 1979

[51] Int. Cl.³ .............................................. G01J 1/42
[52] U.S. Cl. ...................................... 356/222; 356/73
[58] Field of Search ................. 356/218, 323, 73, 319, 356/416, 225, 222, 224; 331/94.5 S; 73/190 EW

[56] References Cited

U.S. PATENT DOCUMENTS 4,035,088  7/1977  Jenkins et al. ........................ 356/218

Primary Examiner—Vincent P. McGraw
Assistant Examiner—Rodney B. Bovernick
Attorney, Agent, or Firm—Nathan Edelberg; Robert P. Gibson; James T. Deaton

[57] ABSTRACT

Apparatus for accurately sampling and measuring beam power of a high energy laser beam without blocking or unduly perturbing the beam for phenomenological effects purposes and including a unitary sampling wheel which reflects a portion of the laser beam energy to a primary collecting and focusing mirror which re-reflects the laser beam onto a low level energy detector and a low level power detector for providing accurate and reliable samples through a wide range of frequencies and low amplitude without affecting beam characteristics and further use.

6 Claims, 3 Drawing Figures

HIGH ENERGY LASER BEAM SAMPLING METER

DEDICATORY CLAUSE

The invention described herein may be manufactured, used, and licensed by or for the Government for governmental purposes without the payment to us of any royalties thereon.

BACKGROUND OF THE INVENTION

The invention of the laser and the subsequent development of the high energy/power laser ($P>200$ kw) focused attention on the potential of the high energy/power laser in the U.S. Army rolls and missions in defense of the United States. In order to evaluate this potential it is necessary to conduct experiments on the characteristic effects of propagation, materials damage and target vulnerability as a function of energy density and total laser beam power. First, a high energy laser beam sampling meter as disclosed in applicants' prior U.S. Pat. No. 4,035,088 was developed; however, this sampling meter was not completely sufficient to provide sufficient cross check on the sample wheel energy extraction efficiency and also the sampling wheel itself as originally made was not sufficient for accomplishing the desired results.

Therefore, it is an object of this invention to provide an improved high energy laser beam sampling meter which includes both a low level energy detector and a low level power detector.

Another object of this invention is to provide a sampling wheel which is made of a unit construction or a one piece wheel.

Still another object of this invention is to provide a high energy laser beam sampling meter which has very fast response time for detecting the reflected energy.

Still another object of this invention is to provide a structure which is mounted on a rigid mount in which each of the components are fixed in rigid relation to each other so as to maintain a fixed and rigid relationship between the elements of the system.

Further objects and advantages of this invention will be obvious to those skilled in this art.

SUMMARY OF THE INVENTION

In accordance with this invention, an improved high energy laser beam sampling meter is provided that includes a new one piece integral sampling wheel for directing a portion of a laser beam to a primary collecting and focusing mirror and then directing the reflected beam to a first detector that has a grating thereover to allow only a portion of the reflection to be detected by the first detector and to reflect the remainder of the beam to a secondary collecting and focusing mirror which re-reflects the sampled beam portion to a second detector which detects low level power. Each of the first and second detectors are connected to an energy recording unit and a power display unit for displaying the results. All the components of this sampling meter are mounted on a common piece of material that is then secured to a base for support.

DESCRIPTION OF THE PREFERRED EMBODIMENT

Figure 1:
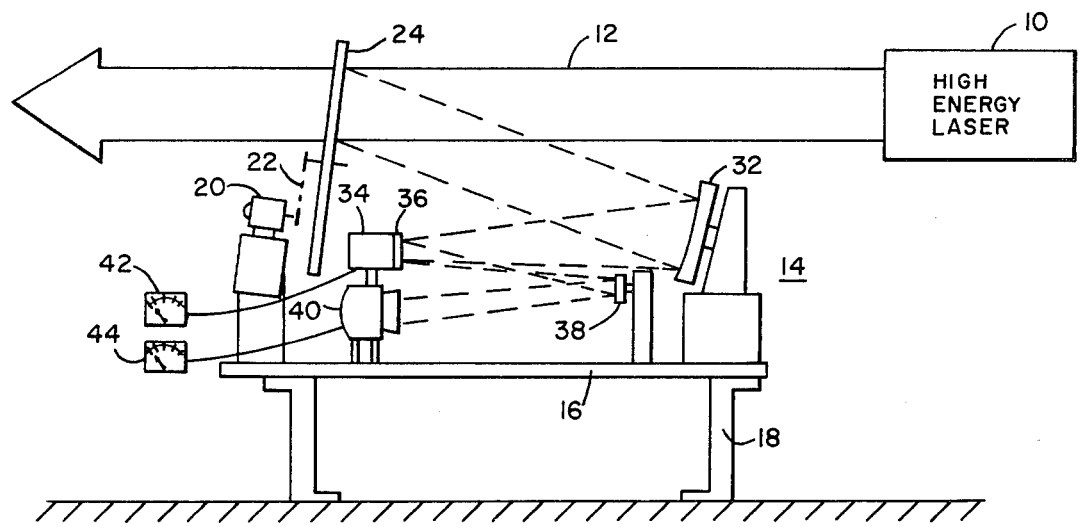
FIG. 1 is a schematic illustration of the improved high energy sampling meter geometry of this invention.
Figure 2:
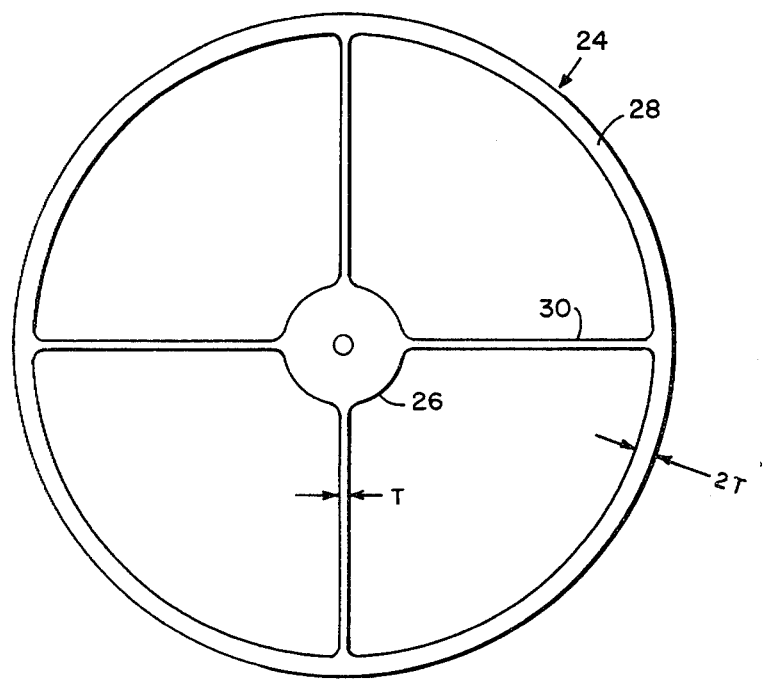
FIG. 2 is a front view of the sampling wheel in accordance with this invention.
Figure 3:
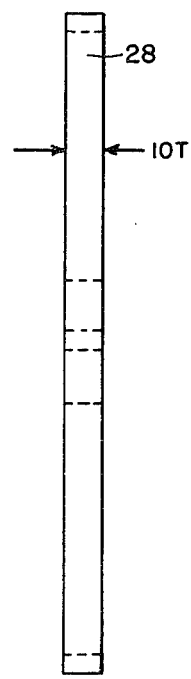
FIG. 3 is a side view of the sampling wheel.

Referring now to the drawings, a sampling meter in accordance with this invention utilizes a high energy laser 10 that has an output 12 that is sampled by sampling meter 14. Sampling meter 14 includes a common base 16 that is connected by support 18 to a mounting structure. A variable speed fractional horsepower motor and drive 20 is mounted in a conventional manner on base 16 as illustrated. Motor 20 is connected through belt drive means 22 to sampling wheel 24. Sampling wheel 24 as illustrated in FIG. 2 includes a central hub section 26 and outer rim section 28 and four connecting rib or fin blades 30. Sampling wheel 24 is made of one integral piece as a unitary body and preferrably is made of a metal such as aluminum. An acceptable thickness for blades 30 has been found to be 0.030 inches with the thickness of rim portion 28 being twice that of blades 30 and the length illustrated in FIG. 3 being ten times that of blades 30. Blades 30 have a length which is approximately 1.5 times the diameter of laser output beam 12. With this relationship, sampling wheel 24 can be adjusted to the angles desired for sampling energy from laser beam 12. It is also pointed out that sampling wheel 12 is made of a unit or one piece structure of aluminum in order to provide a structure that is rugged and has sufficient strength to withstand field use. The use of an integral piece of aluminum also makes it possible to increase the thickness of rim 28 to twice that of blades 30 and with a length ten times that of blades 30. The increase in rim mass produces a gyroscopic stability to sample wheel 24 which improves spacial positioning. Blade 30 reflecting surfaces are polished simultaneously as an integral operation which improves surface parallelism. Belt drive means 22 allows motor 20 to be removed from the proximity of high energy laser beam 12 and thereby preclude thermal damage to motor 20.

Sampling meter 14 also includes a primary collecting and focusing mirror 32 that is mounted in a conventional manner on base 16. Primary collecting and focusing mirror 32 is mounted away from beam 12 and in angular relation with sampling wheel 24 to collect and focus the portion of beam 12 which is reflected by blades 30 from wheel 24. A low level energy detector 34 has a ten percent hole grating 36 placed over the input to low level energy detector 30 to allow reflected energy from primary collecting and focusing mirror 32 to pass through the holes of hole grating 36 and cause the face of hole grating 36 which is reflective to reflect the remainder of the energy to secondary collecting and focusing mirror 38 which is mounted in a conventional manner on base 16. Secondary collecting and focusing mirror 38 then re-reflects energy received to the input of low level power detector 40. Low level energy detector 34 is connected to a display or recording unit 42 and low level power detector 40 is connected to a display or recording unit 44. Low level energy detector 34 is a commercially available type HST-41 unit made by Gulton Industries, with a sensitivity of 10 millivolts per watt per centimeter square and is rated at 1 millisecond or greater. In actuality, this unit has a response time more like 10 milliseconds or less and is a pyro electric detector which detects heat differences. Due to the high sensitivity of low level energy detector 34, 10 percent pass hole grating with a reflective face is used and reflects approximately 90 percent of the reflected energy from primary collecting and focusing mirror 32 onto the secondary collecting and focusing mirror 38. Low level power detector 40 is a shelf item that is made by Coherent Radiation, 3210 Porter Drive, Palo Alto, California 94304, model number 213. This unit has an approximately one second response time or greater and the head of this unit detects energy and an internal electronic conversion section within the unit converts to power. This improved beam sampling meter with the detectors, therefore has a fast response time output detector for comparison with the slower (900 milliseconds or approximately one second) response time detector. This provides a greatly improved system and provides for an energy cross check of the sampling wheel from the readings of displays or recording units 42 and 44.

In operation, with laser 10 on and a beam 12 eminating therefrom and with sampling wheel 24 being rotated up to speed for example of about 15 rps by being driven through belt drive 22 by motor 20, a portion of the energy from beam 12 is reflected by blades 30 onto primary collecting and focusing mirror 32 and re-reflected for a portion of the energy to be transmitted through the 10 percent hole grating of member 36 and for the reflective face of grating 36 to re-reflect energy therefrom to secondary collecting and focusing mirror 38 which re-reflects the remaining portion of the energy to low level power detector 40. The energy passing through the 10 percent grating enters low energy detector 34 and is recorded on recorder 42. Also, the energy reflected to low level power detector 42 is recorded on recorder 44. By having both the low level energy detector 34 and low level power detector 40, and by utilizing recorders 42 and 44, one is able to obtain a fast response output that can be compared with a slower response detector to give a greatly improved energy cross check of the energy reflected by sampling wheel 24. This provides a greatly improved system over that of applicants' prior patent, U.S. Pat. No. 4,035,088.

As can be readily seen, this improved high energy laser beam sampling meter is superior to its predecessor in many ways. For example, this invention has a built-in wider range of sampling frequencies, a wider range of beam interceptance angles, much improved adaptability to fixed laser geometries, a much more rigid and substantial sampling wheel, and both a low level energy detector and a low level power detector which provides a counter check on the total sampled energy.

We claim:

1. A high energy laser beam sampling apparatus comprising: a wheel rotatably mounted in a laser beam, said wheel being in angular relation with an axis of said beam to reflect a portion of said beam therefrom by reflective ribs which have edges from which the beam portion is reflected; means for rotating said wheel at a predetermined spin rate; a first collecting and focusing means disposed for receiving and reflecting said portion of said beam therefrom; a low level energy detector having a hole grating over an input face thereof and said low level energy detector and said hole grating receiving said portion of said beam from said first collecting and focusing means and providing a signal from said low level energy detector which is porportional to the intensity of said beam; said hole grating having a reflective face thereon which reflects a portion of said beam which strikes said reflective face and reflects such portion to a second collecting and focusing mirror, said second collecting and focusing mirror re-reflecting the laser beam portion received to a low level power detector; first indicator means connected to said low level energy detector for detecting the low level energy of the reflected laser beam; and a second indicator means connected to said low level power detector for receiving the signal produced by the low level power detector.

2. A device as set forth in claim 1, wherein said means for rotating said wheel includes a constant speed electric motor that drives through a belt drive means to rotate said wheel at said predetermined speed.

3. A device as set forth in claim 2, wherein said motor, said low level energy detector, said low level power detector, said first collecting and focusing means and said second collecting and focusing means are all mounted on a common base.

4. A device as set forth in claim 1, wherein said wheel is made of a unitary structure which includes a hub with four radially projecting ribs that are interconnected with an outer rim section.

5. A device as set forth in claim 4, wherein said wheel is made of aluminum and said ribs have a length which are 1.5 times the diameter of the laser beam being sampled.

6. A device as set forth in claim 1, wherein said wheel is made of a unitary piece of aluminum which includes a hub with four radially projecting ribs that are integral with an outer rim section, said outer rim section having a thickness which is approximately twice that of each rib and a length which is approximately ten times the thickness of each rib.

* * * * *